March 13, 1934. J. LADO-BORDOWSKY 1,950,915
DEVICE COMBINING LIFT, PROPULSION, AND AUTOPROPULSION FOR AIRCRAFT
Filed Nov. 17, 1932     4 Sheets-Sheet 1

J. Lado-Bordowsky
INVENTOR
By: Marks & Clerk
Attys.

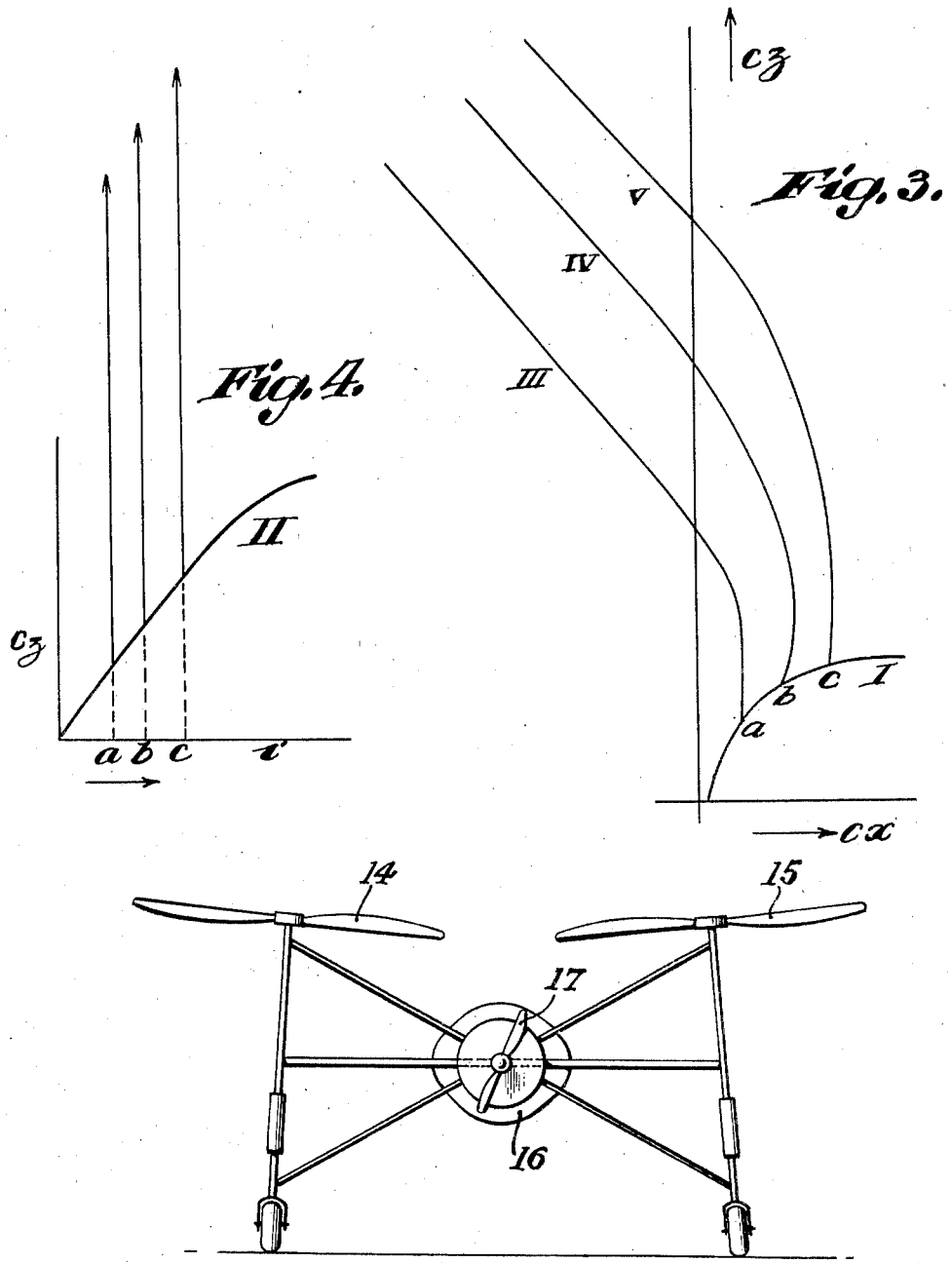

March 13, 1934.   J. LADO-BORDOWSKY   1,950,915
DEVICE COMBINING LIFT, PROPULSION, AND AUTOPROPULSION FOR AIRCRAFT
Filed Nov. 17, 1932    4 Sheets-Sheet 3

J. Lado-Bordowsky
INVENTOR

By: Marks & Clerk
Attys.

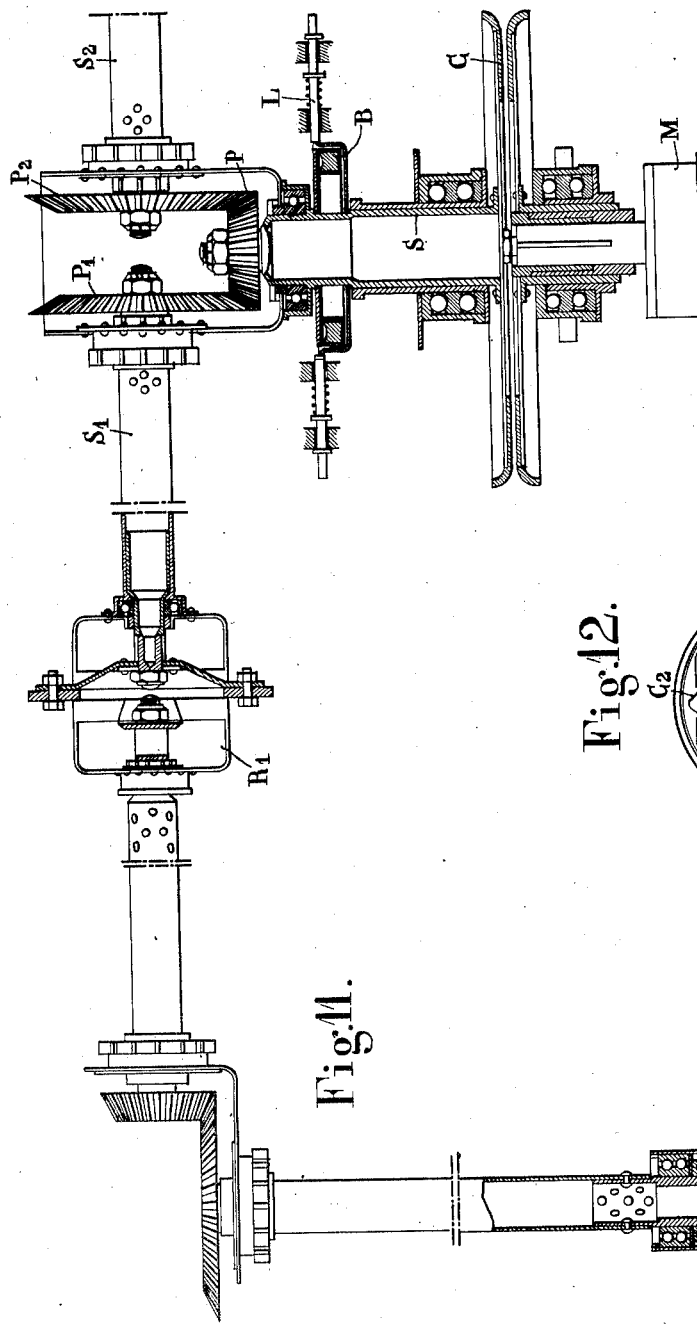

Patented Mar. 13, 1934

1,950,915

UNITED STATES PATENT OFFICE 1,950,915

DEVICE COMBINING LIFT, PROPULSION, AND AUTOPROPULSION FOR AIRCRAFT

Jean Lado-Bordowsky, Boulogne-sur-Seine, France

Application November 17, 1932, Serial No. 643,108
In France November 17, 1931

2 Claims. (Cl. 244—19)

The present invention concerns improvements for flying machines of all kinds but preferably monoplanes, and chiefly combined devices ensuring the lift, propulsion and auto-propulsion of such apparatus.

Devices have already been imagined to increase the lift and steadiness or stability of flying machines; for this purpose, screws or other lifting surfaces comprising blades which rotate in a plane perpendicular, or nearly so, to that of the propeller screw are generally mounted above the wing of the aeroplane.

This present device is fundamentally different from all known devices in that it adds to the propeller airscrew, or airscrews, lifting airscrews or surfaces situated on both sides of the vertical plane of symmetry of the aeroplane, these airscrews or sustaining surfaces being set beneath the wings and at some distance from them, the wings being in front of the propeller screw or screws, that is to say, situated on their suction side; these airscrews or surfaces rotate in a plane nearly parallel to that of the wings, and they work in pairs in which there is always one turning clockwise while the other one is turning anticlockwise.

With this arrangement, the aforesaid lifting airscrews or surfaces naturally produce a lift due to their position and to their rotation as previously mentioned; but at certain forward speeds and with certain speeds of revolutions, they can also provide an auto-propulsion.

The rotational axes of the lifting airscrews converge slightly towards the top according to the kind of machine,—this for reasons of stability.

The characteristic qualities of the present invention will be hereinafter described and defined in greater detail with reference to the annexed drawings which represent some embodiments of the subject matter of the invention by way of example only.

Figs. 1 and 2 diagrammatically show a monoplane machine according to invention and are respectively a plane and a front view thereof.

Figs. 3 and 4 are the characteristic curves of the normal wings or sustaining surfaces, and the curves of the wings with the device according to the invention.

Figs. 6, 7, 8, 9 and 10 are views similar to Figs. 1 and 2, and show the adaptation of the subject matter of the invention to other types of flying machines.

Fig. 11 is a diagram of the transmission between the motor and the lifting screws, Fig. 12 shows the brake and locking device of the above transmission.

Figure 1:
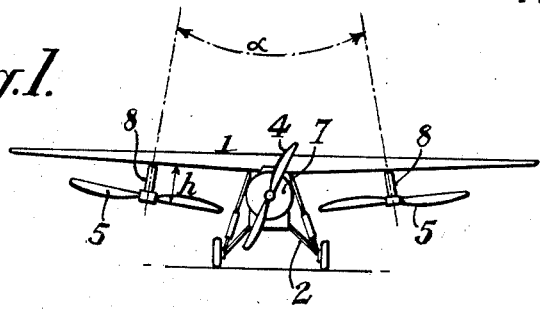
Figure 2:
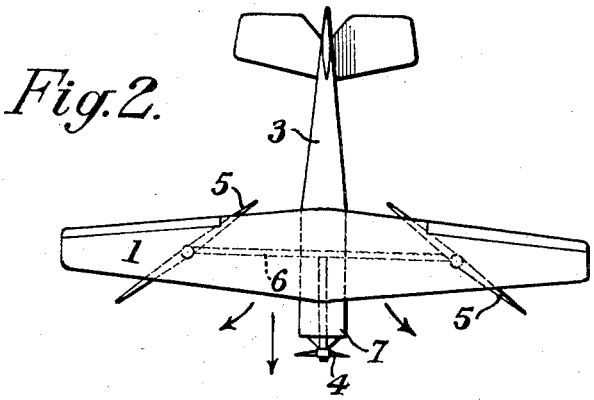

On Figs. 1 and 2, the monoplane 1, comprising a landing gear 2, a body 3 and a propeller airscrew 4, has underneath each plane and at a certain distance $h$ therefrom an airscrew 5 which rotates in a plane nearly parallel to that of the wings; these airscrews 5 are larger than the propeller airscrew, and they are designed in accordance with the characteristics of the aeroplane; they are driven by a common transmission gear 6 situated in the wings and driven itself by the engine, or engines 7, which produce the propelling effort; the axes 8 of these airscrews converge slightly towards the top, making an angle $\alpha$ determined in accordance with the characteristics of the machine to build.

In any case, it must be possible to clutch or unclutch the transmission shaft 6 from the pilot's seat; the motor or motors 7 actuating the screws 5 may be the same as those actuating the propeller screws, or different ones.

The airscrews 5 rotate in opposite directions: the right one to the right the left one to the left, as shown by the arrows on the drawings.

It has been found that under such conditions the group of airscrews 5 will considerably increase the lift and ensure auto-propulsion at certain determined revolutions and forward speeds.

Figs. 3 and 4 show the two types of characteristic curves for aircraft wings;

If the abscissas give the drag coefficient ($Cx$) and the ordinates the lift coefficient ($Cz$) for different angles of attack, the resulting curve is I (Fig. 3) which is the polar curve of the wing.

Similarly, the abscissas giving the incidence ($i$) and the ordinates the lift ($Cz$), one gets the curve II: $Cz=Ki$.

Now, it has been found, in accordance with the present invention, that by starting from a point $a$ of the normal polar of the wing which corresponds to a given incidence, and setting the group of lifting airscrews into action as above described, a new curve will be obtained corresponding to determined revolutions and forward speeds (III) said curve being such that the drag soon becomes negative; in other words, the curve is the polar curve of auto-propulsion.

For points $b$, $c$ taken on the normal polar curve I, and corresponding to given incidences, one gets in a similar way, with the lifting screws, the curves IV, V which give the same results.

Figure 5:
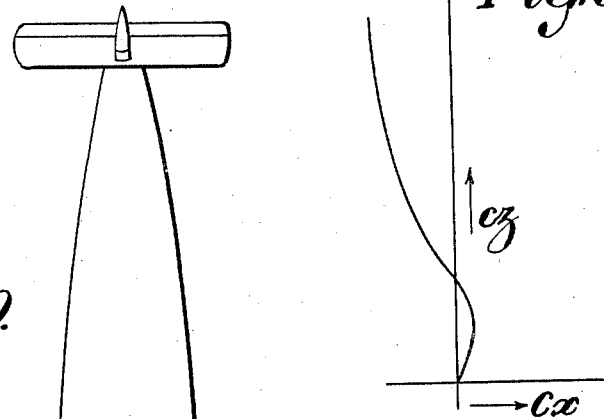
Fig. 5 is the curve of a pair of lifting screws.

The curve on Fig. 5 is the curve referring to a pair of isolated lifting screws, the airflow being parallel to the plane of the disc area; it shows the increase of lift and the auto-propulsion of the lifting screws for determined rotary and forward speeds.

Fig. 6 shows such a typical combination of only two lifting airscrews 14, 15 suitably fixed on the body 16 and working together with a propeller screw 17.

The above described combination, of lifting and propeller airscrews greatly increases the total lift and gives auto-propulsion.

At his will, and with suitable gearings, the pilot may work the lifting screws at full speed, at a reduced speed, or windmill fashion, in harmony with the speed of the propeller screws and with the circumstances of flight of the machine; he will thus obtain the different cases of: normal forward movement with lift given by the wings, forward movement with lift increased by the lifting airscrews whitling windmill fashion, or forward movement, lift greatly increased and auto-propulsion. For this purpose, the motor drives the lifting screws through the medium of a transmission arranged as follows:

M is the motor, and S is the shaft of this motor, on which a clutch C is mounted. On said shaft S, a brake B and a locking device L are also mounted.

Shaft S actuates the lifting screws—the one of which has its hub indicated at $L_1$—through the medium of a transmission comprising pinions P, $P_1$, a shaft $S_1$, and a resilient coupling $R_1$.

The transmission actuating the other screw of the couple is symmetrically arranged, and Fig. 11 shows the pinions P, $P_2$ and shaft $S_2$ of it.

The operation is as follows:

For ensuring the driving of the lifting screws by motor M, clutch C is set into operative position, and the power is then transmitted to the lifting screws through the medium of the above transmission.

For setting the lifting screws into auto-rotation, clutch C is set into unoperative position, and the auto-rotation is ensured by the inertia of the screws, and by the draught due to the translation.

For then setting the lifting screws in the flight line, one stops shaft S by means of brake B actuated by a control member $C_2$, and, in order to hold the screws in the said flight line, one locks the transmission by means of device L, actuated by a control member $C_1$; said device automatically sets the lifting screws in the wanted direction.

For then ensuring anew the driving of the lifting screws by motor M, one first sets locking device L into unoperative position, and then releases brake B.

Figure 7:
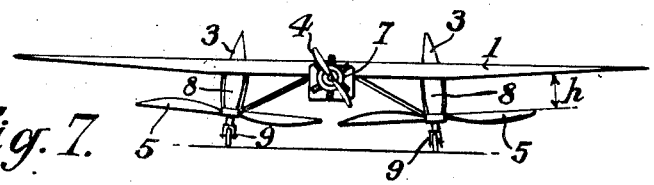
Figure 8:
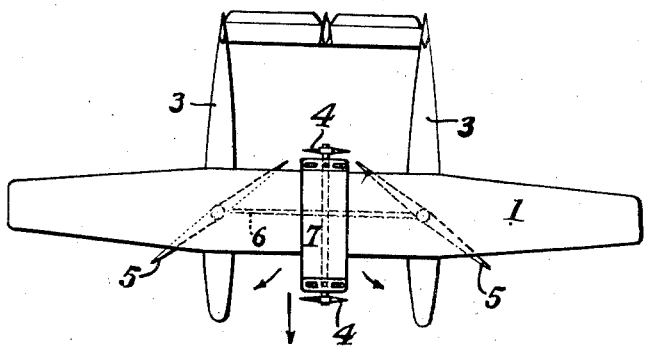

Figs. 7 and 8 show the adaptation of the device according to the present invention to another type of aeroplane. The lifting airscrews 5, with converging axes, 8, are fixed underneath and at a certain distance from the wings 1 on the undercarriage struts 9; the drive shafts 6 are mounted in the wings, connected with their driving engine or engines 7 which themselves may be the driving engines of the propeller screws 4.

Figure 9:
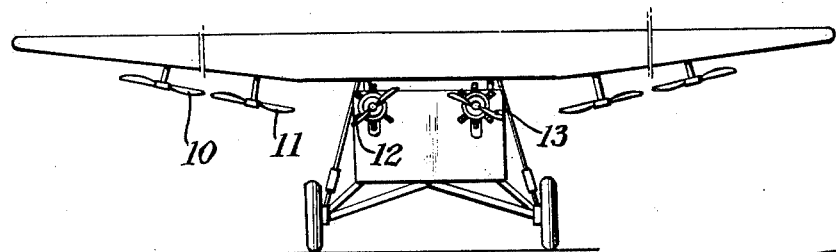
Figure 10:
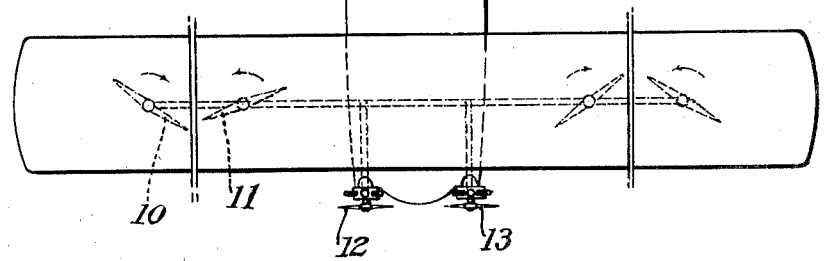

Figs. 9 and 10 show an airplane of great wing span with two pair of lifting airscrews 10, 11 combined with two groups of propeller screws 12, 13.

The lifting airscrews of each pair 10, 11 turn round in opposite directions as has been explained in the preceding instances.

It should be well understood that these ways of adapting the invention to machines of known types have been described by way of example only and that my invention is not limited thereto; it must also be understood that the lifting airscrews shall be designed and tilted according to the data of the machine under consideration; their number may vary according to necessity as well as their distance from the axis of the machine and from the plane of the wings; and it will be possible to use any convenient means of driving these airscrews, provided with any suitable clutch, without departing thereby from the scope of this invention.

I claim:

1. An aircraft, comprising wings, at least a propeller screw, at least a pair of lifting screws mounted underneath the wings, at a certain distance therefrom, on each side of the vertical plane of symmetry of the apparatus, the two lifting screws of each pair rotating in opposite directions, the right one to the right and the left one to the left, in a plane substantially parallel to that of the wings, the latter being in front of the propelling screw or on its suction side, a motor, a transmission between said motor and said lifting screws, said transmission comprising a clutch, a brake and a locking device, and a resilient coupling on the shaft of each lifting screw.

2. An aircraft, comprising wings, at least a propeller screw, at least a pair of lifting screws mounted underneath the wings, at a certain distance therefrom, on each side of the vertical plane of symmetry of the apparatus, the two lifting screws of each pair rotating in opposite directions, the right one to the right and the left one to the left, in a plane substantially parallel to that of the wings, and acting moreover as auto-propellers, the wings being in front of the propelling screw or on its suction side, a motor, a transmission between said motor and said lifting screws, said transmission comprising a clutch, a brake and a locking device, and a resilient coupling on the shaft of each lifting screw.

JEAN LADO-BORDOWSKY.